(12) United States Patent
Scott et al.

(10) Patent No.: US 8,890,082 B2
(45) Date of Patent: Nov. 18, 2014

(54) RADIATION DETECTION

(75) Inventors: Paul Scott, Durham (GB); Ian Radley, Durham (GB)

(73) Assignee: Kromek Limited, Durham (GB)

( * ) Notice: Subject to any disclaimer, the term of this patent is extended or adjusted under 35 U.S.C. 154(b) by 217 days.

(21) Appl. No.: 13/259,214

(22) PCT Filed: May 18, 2010

(86) PCT No.: PCT/GB2010/050806
§ 371 (c)(1),
(2), (4) Date: Oct. 28, 2011

(87) PCT Pub. No.: WO2010/133871
PCT Pub. Date: Nov. 25, 2010

(65) Prior Publication Data
US 2012/0037810 A1    Feb. 16, 2012

(30) Foreign Application Priority Data

May 19, 2009  (GB) .................................. 0908582.0
Jun. 3, 2009   (GB) .................................. 0909507.6
Dec. 11, 2009  (GB) .................................. 0921676.3

(51) Int. Cl.
*G01T 1/24*    (2006.01)
(52) U.S. Cl.
CPC ...................................... *G01T 1/247* (2013.01)
USPC .................................................... 250/370.09
(58) Field of Classification Search
USPC .............. 250/361 R, 363.06, 370.08, 370.09, 250/370.13
See application file for complete search history.

(56) References Cited

U.S. PATENT DOCUMENTS

| 5,349,193 | A  | * | 9/1994 | Mott et al. ................ 250/370.06 |
| 5,854,489 | A  |   | 12/1998 | Verger et al. |
| 7,026,622 | B2 | * | 4/2006 | Kojima et al. ........... 250/363.03 |
| 2005/0230632 | A1 |   | 10/2005 | Montemont et al. |
| 2006/0276706 | A1 | * | 12/2006 | Klein et al. .................. 600/407 |

FOREIGN PATENT DOCUMENTS

| EP | 1019568 A1   | 7/2000 |
| FR | 2866713 A1   | 8/2005 |
| JP | 2001194460 A | 7/2001 |
| JP | 2006058046 A | 3/2006 |
| JP | 2006071463 A | 3/2006 |

(Continued)

OTHER PUBLICATIONS

Eberle, Katja, "International Search Report" for PCT/GB2010/050806, as mailed Aug. 1, 2011, 4 pages.

(Continued)

*Primary Examiner* — Casey Bryant
(74) *Attorney, Agent, or Firm* — Winstead PC (57) ABSTRACT

A method and apparatus for correction of detected radiation data from a semiconductor device are described. The method comprising the steps of measuring a pulse energy reading from radiation incident at the semiconductor device; filtering the signal and determining the time that the filtered signal exceeds a predetermined threshold energy; if the determined time is within predetermined parameter(s) comprising at least a predetermined maximum, storing the pulse energy reading in a first, pulse energy data register; if the determined time is above a predetermined maximum, discarding the pulse energy reading and incrementing a count in a second, discard data register; repeating the above steps to acquire a dataset of pulse energy readings of a desired size in the first data register; and on completion of such acquisition; using the discard data register to supplement the dataset of pulse energy readings by numerically correcting discarded counts and adding back into the dataset of pulse energy readings.

13 Claims, 4 Drawing Sheets

(56) References Cited

FOREIGN PATENT DOCUMENTS

| JP | 2007327902 A | 12/2007 |
| WO | WO-99/10571 A1 | 3/1999 |
| WO | WO-2005/085905 A1 | 9/2005 |

OTHER PUBLICATIONS

Seller, P., et al., "Nucam: a 128 Channel Integrated Circuit with Pulse-Height and Rise-Time Measurement on Each Channel Including on-Chip 12bit ADC for High-Z X-Ray Detectors", Nuclear Science Symposium Conference Record, 2006. IEEE, Piscataway, NJ, USA, Oct. 29, 2006, pp. 3786-3789.

Redus, R., et al., "Electronics for high resolution spectroscopy with compound semiconductors", Nuclear Instruments & Methods in Physics Research, Section—A:Accelerators, Spectrometers, Detectors and Associated Equipment, Elsevier, Amsterdam, NL, vol. 380, No. 1-2, Oct. 1, 1996, pp. 312-317.

* cited by examiner

RADIATION DETECTION

The invention relates to a method of detection of radiation and to a method of processing of detected radiation data from a semiconductor device for high energy physics applications, such as a detector for high energy radiation, for example high energy electromagnetic radiation such as x-rays and/or gamma rays, or subatomic particle radiation. The invention also relates to a detector device embodying the principles of the method. The invention in particular relates to a semiconductor detector device comprising a large direct band gap semiconductor material, for example a group II-VI semiconductor material such as cadmium telluride (CdTe), cadmium zinc telluride (CZT), cadmium manganese telluride (CMT) or the like, for example formed as a bulk single crystal.

Cadmium telluride and similar semiconductor materials have found application in recent years in a variety of high energy physics applications, such as high energy radiation detection. In particular their ability to resolve high energy electromagnetic radiation such as x-rays or gamma rays spectroscopically has been utilised. This may be especially the case where the material is fabricated as a bulk scale single crystal, which has become a more practical proposition as a result of the development of bulk vapour deposition techniques, for example multi-tube physical vapour phase transport methods, such as that disclosed in EP-B-1019568. For example devices may be fabricated for the detection of radiation at a detector from a suitable high energy source either directly or after interaction with an object under test, involving for example transmission, scattering, backscattering, absorption etc.

The high quantum efficiency of CdTe and CZT and CMT makes these materials ideal for high energy spectroscopy applications. However, due to low hole mobility, incomplete read out of hole signals may limit spectral resolution. This is particularly observable in high count rate applications where signal shaping times are short. Also in high energy applications device thicknesses are large leading to a large distance between electrodes.

According to the invention in a first aspect a method of detection of radiation comprises the steps of:
causing radiation to impinge on a face of the semiconductor detector device, for example directly from a radiation source or after an interaction with an object, for example comprising transmission, scattering, backscattering, absorption etc;
detecting an energy pulse at the detector;
measuring a pulse energy reading;
filtering the signal and determining the time that the filtered signal exceeds a predetermined threshold energy;
if the determined time is within predetermined parameter(s) comprising at least a predetermined maximum and preferably also a predetermined minimum, storing the pulse energy reading in a first, pulse energy data register;
if the determined time is above a predetermined maximum, discarding the pulse energy reading and incrementing a count in a second, discard data register;
repeating the above steps to acquire an energy spectrum dataset of pulse energy readings of a desired size in the first data register; and on completion of such acquisition
using the discard data register to supplement the dataset of pulse energy readings by numerically correcting discarded counts and adding back into the energy spectrum dataset.

According to the invention in a further aspect, a method of processing of detected radiation data from a semiconductor device comprises:
measuring a pulse energy reading from radiation incident at the semiconductor device;
determining the time that the pulse exceeds a predetermined threshold energy;
if the determined time is within predetermined parameter(s) comprising at least a predetermined maximum and preferably also a predetermined minimum, storing the pulse energy reading in a first, pulse energy data register;
if the determined time is above a predetermined maximum, discarding the pulse energy reading and incrementing a count in a second, discard data register;
repeating the above steps to acquire a dataset of pulse energy readings of a desired size in the first data register; and on completion of such acquisition
using the discard data register to supplement the dataset of pulse energy readings by numerically correcting discarded counts and adding back into the dataset of pulse energy readings.

In accordance with the invention in a further aspect, a device for the detection of radiation is described operatable on the principles of the method.

Thus, the device comprises:
a semiconductor radiation detector;
a means for detecting an energy pulse at the detector, for example by sampling the response of the detector;
a pulse energy reader to measure energy of the energy pulse;
a clock means to determine the time that the pulse energy exceeds a predetermined threshold energy;
a pulse time parameter data register storing predetermined parameter(s) for the time that the pulse energy exceeds a predetermined threshold energy comprising at least a predetermined maximum and preferably also a predetermined minimum;
a data processing module to evaluate whether the time that the pulse energy exceeds a predetermined threshold energy is within said predetermined parameter(s), to store the pulse energy reading in a first, pulse energy data register if the time is within said predetermined parameter(s), and to discard the pulse energy reading and increment a count in a second, discard data register if the determined time is above a predetermined maximum;
a spectrum correction module to supplement the dataset of pulse energy readings by numerically correcting discarded counts by addressing the discard data register and adding these corrected counts back into the dataset of pulse energy readings.

Thus, in accordance with the principles of the invention, data is acquired at the detector for example via an appropriate sampling algorithm in familiar manner. A pulse is detected by determining when a pulse energy reading rises above a defined threshold value. A peak value may be determined. Once the pulse has returned below the defined threshold value the time the pulse energy was above that threshold is calculated.

Each pulse is analysed against predetermined threshold parameters. At least a predetermined maximum time is set. Preferably a predetermined minimum time is set. If the time that a pulse exceeds a threshold pulse height exceeds a predetermined maximum the pulse is not stored in the energy spectrum data register but a discard count is added to the discard register. If a predetermined minimum time is set and the time that a pulse exceeds a threshold pulse height is below this the pulse is not stored in the energy spectrum data register but is discarded entirely as assumed noise. If the time that a pulse exceeds a threshold pulse height is within the predetermined parameter(s) the pulse is stored in the pulse energy data register.

Preferably, acquired energy data is resolved in energy selective manner at a plurality of energies and/or across a plurality of energy bands. Preferably the pulse energy data register comprises a plurality of energy selective bins and each pulse is selectively stored in one of such bins according to the height of the pulse.

The process of collecting or discarding pulses is repeated until a representative large plurality of pulses has been acquired in the pulse energy data register, in particular in spectrally resolved manner as an energy spectrum dataset. This completes an initial acquisition phase. The invention is distinguished particularly in that in a subsequent supplementary data correction stage the dataset is supplemented by correction based on the discard count. A discard is assumed to indicate detection of a real pulse with a partially read out hole signal. Once the acquisition is complete the discarded counts are energy corrected and added back into the energy data register thus better preserving the total count rate and maintaining the spectral resolution.

In a preferred further stage the energy spectrum dataset may be corrected numerically to a notional infinitely thick detector. As the detector is of finite thickness it is less sensitive to high energy photons. Therefore simple adding back of counts in the ratio of the generated spectrum would result in the spectrum being preferentially skewed in favour of low energy photons. If the attenuation coefficient and actual thickness of the detector are known this can be corrected for, thereby giving a spectrum equivalent to that seen from an infinitely thick detector and therefore more representative of the incident photon flux.

The resultant corrected energy spectrum dataset may be stored or output to another device for further processing.

The semiconductor material comprising the device is preferably a material adapted for high energy physics applications, such as a material able to act as a detector for high energy radiation, and for example high energy electromagnetic radiation such as x-rays or gamma rays, or subatomic particle radiation. The resultant device comprises at least one layer of such material and is thus a device adapted for high energy physics applications, and for example a detector for high energy radiation such as x-rays or gamma rays, or subatomic particle radiation.

The semiconductor device is preferably a detector device adapted to exhibit a spectroscopically variable response across at least a substantial part of the radiation spectrum in use. In particular the semiconductor material exhibits inherently as a direct material property a direct variable electrical and for example photoelectric response to different parts of the radiation spectrum in use.

In a preferred embodiment the semiconductor material is formed as a bulk crystal, and for example as a bulk single crystal (where bulk crystal in this context indicates a thickness of at least 500 µm, and preferably of at least 1 mm).

In a preferred embodiment the semiconductor material may be selected from Group II-VI semiconductors and in particular may be selected from cadmium telluride, cadmium zinc telluride (CZT), cadmium manganese telluride (CMT), and alloys thereof, and for example comprise crystalline $Cd_{1-(a+b)}Mn_aZn_bTe$ where $a+b<1$ and a and/or b may be zero.

Similarly a radiation source may be a single broad spectrum source across which a plurality of bandwidths or single energies may be identified. Alternatively or additionally sources may be provided having narrow bandwidths or generating incident radiation at one or more discrete energies to provide some of the energies for comparison in accordance with the method of the invention. In this case the radiation source is a plural source comprising a combination of sources at different energies to provide the necessary total spectrum spread to allow resolution by the detector across a plurality of energies/energy bands. For example a plural source comprises an x-ray source having a continuous Bremsstrahlung spectrum for example from 0 to 160 keV or a radioisotope with discrete emission lines, for example $^{57}Co$ with emission lines at 14 keV, 122 keV and 136 keV.

The source is preferably capable of generating a sufficiently broad spectrum of radiation to enable the spectral resolution necessary for the performance of the invention. Preferably the source generates radiation across at least one or more parts of the range of 20 keV to 1 MeV, and more preferably across at least a part, and for example a major part, of the range of 20 keV to 160 keV. For example the source generates radiation ranging across at least one bandwidth of at least 20 keV within the given range. For example the spectrum is such that at least three 10 keV bands can be resolved within that range.

It will be understood generally that a numerical or other data processing step in the method of the invention can be implemented by a suitable set of machine readable instructions or code. These machine readable instructions may be loaded onto a general purpose computer, special purpose computer, or other programmable data processing apparatus to produce a means for implementing the step specified. For example, the signal from the detector and associated electronics may be converted into an energy spectrum by a Field Programmable Gate Array (FPGA).

These machine readable instructions may also be stored in a computer readable medium that can direct a computer or other programmable data processing apparatus to function in a particular manner, such that the instructions stored in a computer readable medium produce an article of manufacture including instruction means to implement some or all of the numerical steps in the method of the invention. Computer program instructions may also be loaded onto a computer or other programmable apparatus to produce a machine capable of implementing a computer executed process such that the instructions are executed on the computer or other programmable apparatus providing steps for implementing some or all of the data processing steps in the method of the invention. It will be understood that a step can be implemented by, and a means of the apparatus for performing such a step composed in, any suitable combinations of special purpose hardware and/or computer instructions.

The invention will now be described by way of example only with reference to FIGS. 1 to 5 in which.

In accordance with an example embodiment of the invention, an algorithm has been written which enables excellent spectral resolution to be achieved from planar CdTe/CdZnTe detectors. This is applicable to both high count rate and high energy applications and works by removing events in which the hole signal is only partially read out. These events are then energy corrected by the algorithm and added back into the spectrum enabling both resolution and count rate to be preserved.

The algorithm is conveniently implemented using an Field Programmable Gate Array (FPGA) and is capable of real time processing at high input count rates typical in an x-ray application. Details of the algorithm along with experimental results from a planar CdTe detector are presented.

Detector System

Figure 1:
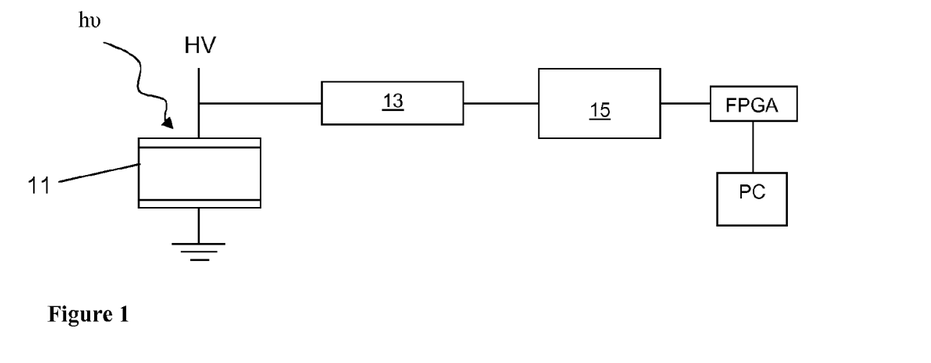
FIG. 1 is an example of a detector device for use in accordance with the invention.

The detector system shown in FIG. 1 comprises of a planar CdTe detector (11) which is irradiated by x-rays or gamma rays (hv). The signal from the detector is then read out by the preamplifier (13) and shaping amplifier (15) and converted into an energy spectrum by the Field Programmable Gate Array (FPGA). It will be appreciated that each component is merely an example of a suitable element by means of which the inherent resolution of a suitable detector may be converted into an energy spectrum which could be used individually or collectively with other suitable component.

The Algorithm

Figure 2:
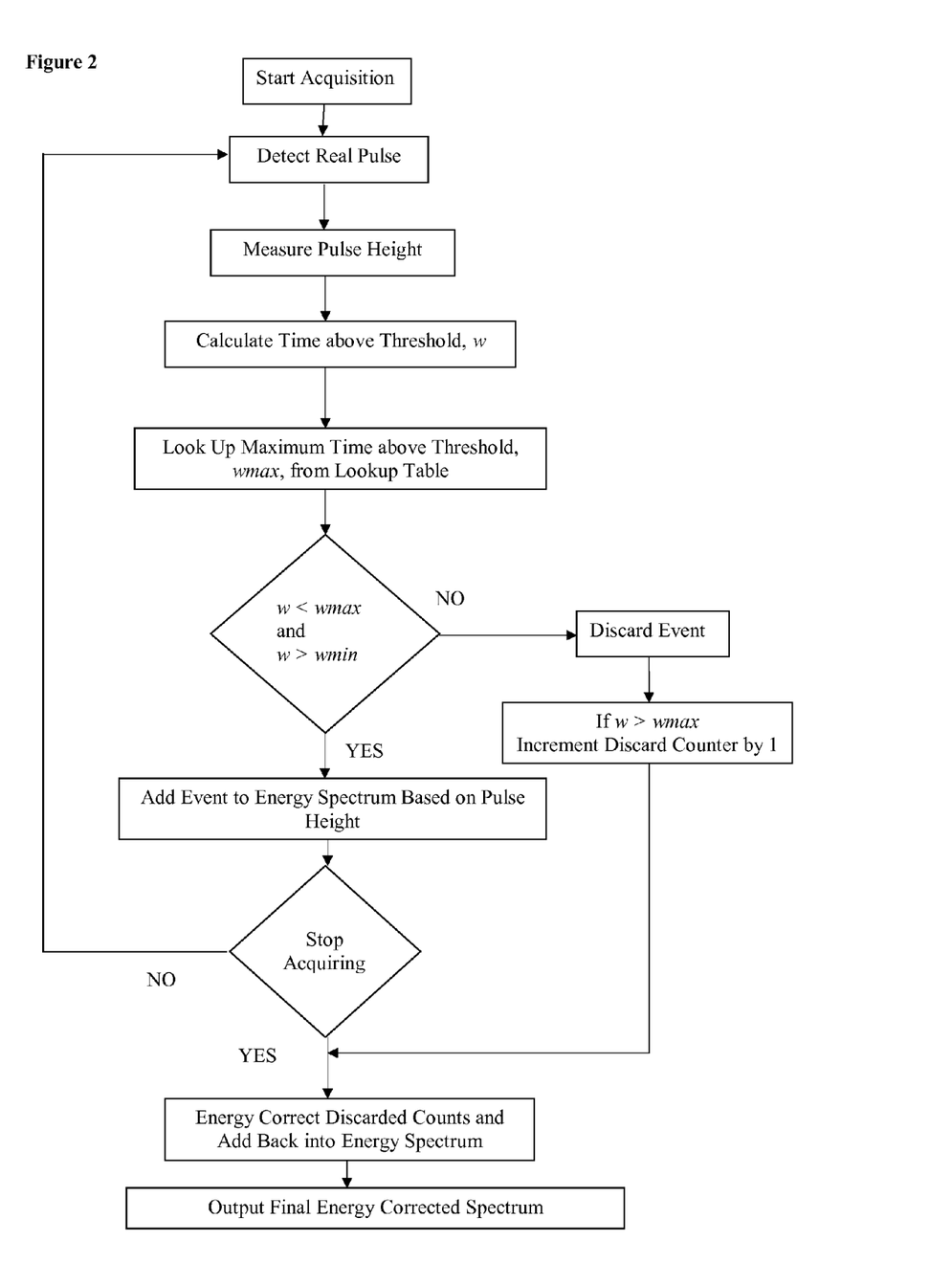
FIG. 2 is an example algorithm embodying the principles of the method of the invention.

FIG. 2 shows a suitable algorithm implementing the invention. The algorithm in the embodiment samples the output from the shaping amplifier at a sample rate of 200 MHz. Once it has detected a 'real' pulse it continues to sample and hold the highest value in order to detect the peak. Once the pulse has returned below a defined threshold value it then calculates the time the pulse spent above that threshold.

If the pulse is within the parameters set by the lookup table then the pulse is added to one of 32 bins depending on the height of the pulse. If the pulse does not fall within the criteria of the lookup table, the pulse is either:

(1) Discarded completely as it is regarded by the algorithm as noise; or
(2) A discard counter is incremented by 1. This notes that a real pulse with a partially read out hole signal has been detected.

Once the acquisition is complete the discarded counts are energy corrected and added back into the spectrum thus preserving the total count rate and maintaining the spectral resolution.

System Information

1. The system samples the incoming data at 5 ns intervals, or a sampling rate of 200 MHz.
2. The incoming pulse is expected to have a peak amplitude of 1 volt or less. In this application 1 volt is defined as corresponding to a pulse generated by 160 keV photons however this can readily recalibrated to any required energy range.
3. The A to D is limited to an 8 bit resolution, thus dividing the input voltage into 256 steps. Each step (one LSB) corresponds roughly 0.625 keV.
4. The peak voltage values read are sorted into 32 bins, so each bin represents 8 steps or an interval of 5 keV.
5. For the existing systems, the noise appears predominantly below 11 bits, corresponding approximately to 7 keV. The bottom two bins are therefore predominantly noise.
6. The noise discrimination floor is therefore set at 15 bits, or approximately 60 mv.

Pulse Detection Algorithm

1. Sample values below 16 bits are considered to be below the discrimination level and are discarded.
2. When a sample with an analogue value of 16 bits or greater (>60 mV) is detected, the state machine is set to 1. This point is defined as point a.
3. If the next sample is at least 1 bit (4 mV) greater in value than the previous sample, the state machine is set to 2. If not it is reset to zero.
4. If the next sample is at least 1 bit greater in value than the previous sample, the state machine is set to 3. If not it is reset to zero.
5. When the state machine is set to 3, pulse detect is set true, and a pulse is considered valid. The pulse sample register is set to zero.
6. At the next sample, the analogue value of the pulse is written to the pulse value register and the pulse sample register is incremented to 1.
7. At the next sample, the analogue value of the pulse is compared with the stored value, and the stored value is updated if the new value is greater. No action is taken if the new value is equal to or less than the stored value. The pulse sample register is once again incremented.
8. The system continues to sample the analogue value at 5 ns intervals until the pulse returns below 60 mV. This point is defined as point b and the value held in the pulse value register is defined as the height of the pulse, h.
9. The time of the pulse above the threshold, w, is defined as b−a.
10. The system looks up the maximum and minimum allowed time above the threshold (wmax and wmin respectively) from a lookup table based on the pulse height, h.
11. If w>wmin and w<wmax the pulse is stored into one of 32 bins based on its height.
12. If w<wmin the pulse is discarded.
13. If w>wmax the pulse is discarded and the discarded pulse counter is incremented by 1.

Lookup Table

Pulses with incomplete hole charge collection exhibit wider base widths than that of an ideal pulse. A lookup table is generated using a modelled CR-RC network which is representative of the output from the shaping amplifier in use. A 32 item lookup table containing w as a function of h is then generated where h ranges from 60 mV to 1 V.

Figure 3:
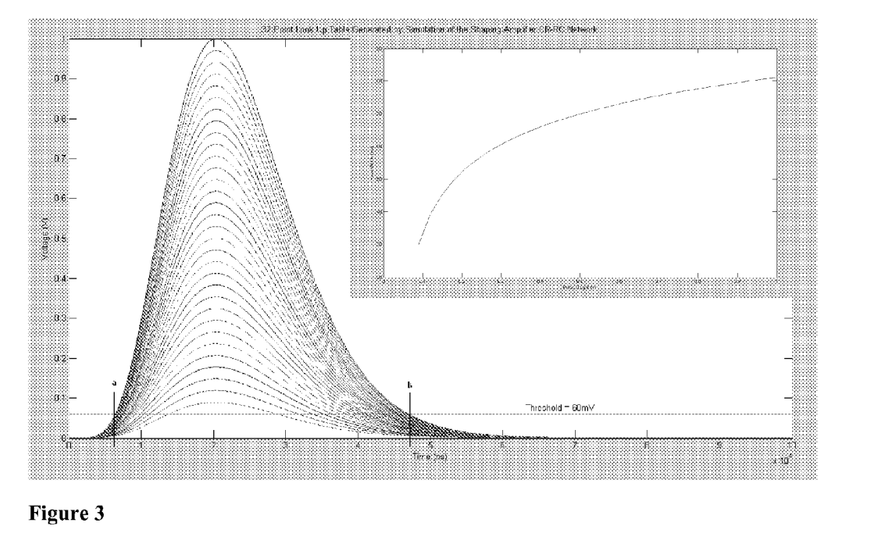
FIG. 3 is a graph showing 32-pulses of various heights 60 mV to 1V with a low level discriminator threshold of 60 mV; the time above the threshold increases as a function of pulse height; the inlayed graph shows a plot of the lookup table generated.

FIG. 3 shows a plot of w as a function of pulse height. Here it can be seen that larger pulses have wider base widths meaning that the rejection criteria must also take into account the pulse height, giving a wider acceptance window to larger amplitude pulses.

From this lookup table the value of wmax can then be defined. This is given by multiplying each value of w by a constant, C, where C>1. This accounts for the difference between the ideal case shown in FIG. 3 and a real detector. The value of the constant can be varied in order to optimise the spectral resolution. Values of C close to 1 provide aggressive filtering and larger values of C provide less aggressive filtering.

Each pulse is inspected for evidence of a slow hole component by measuring w and comparing it to the relevant wmax value in the lookup table. If w is greater than wmax the pulse is rejected and the discard counter is incremented by 1.

Figure 4:
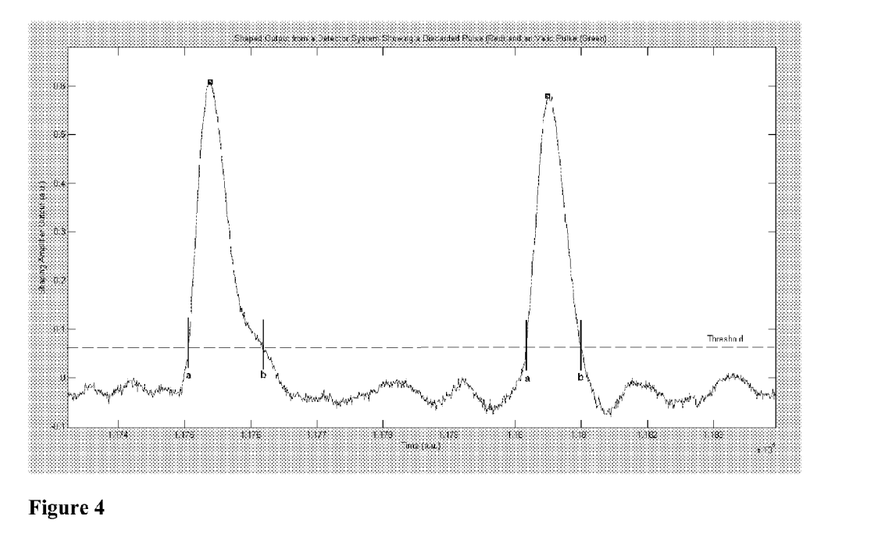
FIG. 4 shows the output from an oscilloscope sampling the shaper output at 200 MHz; the pulse on the left of the image is discarded by the algorithm as b−a>vmax.

The algorithm has been simulated using a Matlab program. Data was acquired using an oscilloscope sampling at the same frequency as the FPGA. The data was then analysed using the Matlab algorithm and the output for two events is shown in FIG. 4.

Above threshold noise spikes can occur sporadically. The form is occasionally of such that they can be passed as real pulses by the first stage of the filter algorithm. This is avoided by applying a second condition to the rejection stage of the algorithm, w>wmin. This allows all pulses which are narrow in the time domain to be rejected irrespective of their amplitude. As these pulses are regarded as noise the discard counter is not incremented in this case.

Add Back of Deleted Counts

After the acquisition is completed the total counts in the discarded counter are redistributed back into the spectrum. This is done by weighting the number of added back counts per channel (i.e. energy) both to the distribution of counts in the original spectrum and to the mass attenuation coefficient of the detector at each given energy.

Figure 5:
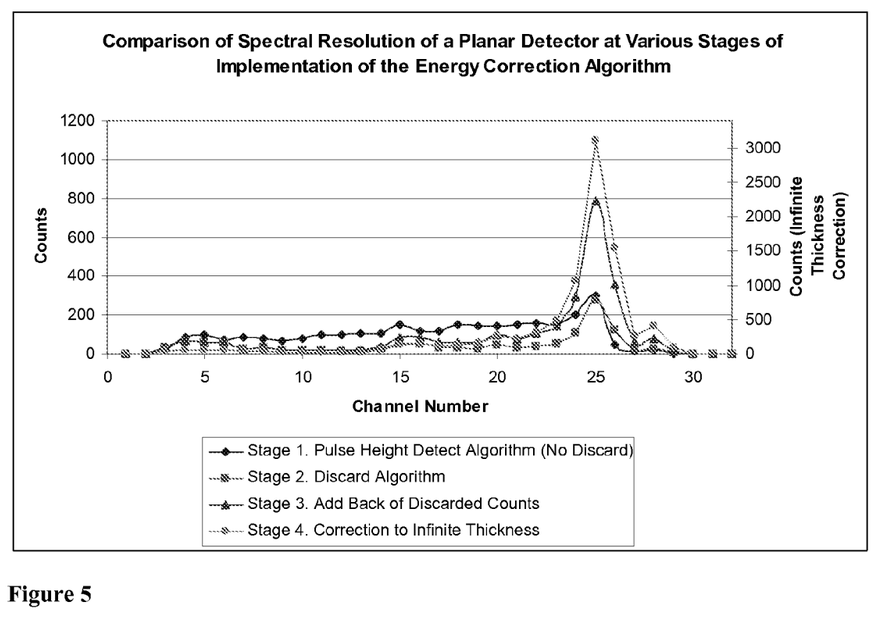
FIG. 5 is output of the algorithm at various stages of implementation; here a planar CdTe detector was irradiated using a $^{57}Co$ source as shown in FIG. 1.

FIG. 5 shows the results of a comparison of spectral resolution of a planar detector at various stages of implementation of the energy correction algorithm as follows.

Stage 1. Pulse Height Detect Algorithm (No Discard)—shows the spectrum which would be acquired if all pulses were included in the spectrum irrespective of the amount of incomplete hole charge collection.

Stage 2. Discard Algorithm—this stage shows the effect of discarding the events where there is evidence of incomplete hole charge collection. Here it can be seen that the resolution of the peak in channel 24 is improved.

Stage 3. Add Back of Discarded Counts—here the discarded counts are added back into the spectrum with the energy correction applied. This improves the spectrum further and allows the count rate to be maintained.

Stage 4. Correction for Infinite Thickness—as the detector is of finite thickness it is less sensitive to high energy photons. Therefore the spectrum is preferentially skewed in favour of low energy photons reducing the counts in the higher bins relative to those in lower bins. As the attenuation coefficient of the detector is known this can be corrected, thereby giving a spectrum equivalent to that seen from an infinitely thick detector and therefore more representative of the incident photon flux.

The invention claimed is:

1. A method of processing of detected radiation data from a semiconductor device, the method comprising the steps of:
measuring a pulse energy reading from radiation incident at the semiconductor device;
filtering a signal representing the pulse energy reading and determining a time the filtered signal exceeds a predetermined threshold energy;
if the determined time is within predetermined parameter(s) comprising at least a predetermined maximum, storing the pulse energy reading in a first pulse energy data register;
if the determined time is above the predetermined maximum, discarding the pulse energy reading and incrementing a count in a second discard data register;
repeating the above steps to acquire a dataset of pulse energy readings of a desired size in the first pulse energy data register, wherein the dataset of pulse energy readings is resolved in an energy selective manner at at least one of 1) a plurality of energies and 2) across a plurality of energy bands; and
on completion of the dataset of pulse energy readings, using the second discard data register to supplement the dataset of pulse energy readings by numerically correcting discarded counts and adding back into the dataset of pulse energy readings at at least one of 1) the plurality of energies and 2) across the plurality of energy bands.

2. The method in accordance with claim 1, wherein the predetermined parameters further comprise a predetermined minimum time, and wherein if the time that a pulse exceeds a threshold pulse height is below the predetermined minimum time the pulse is not stored in the pulse energy data register but is discarded entirely as assumed noise.

3. The method in accordance with claim 2, wherein the pulse energy data register comprises a plurality of energy selective bins and each pulse is selectively stored in a bin of the plurality of energy selective bins according to a height of the pulse.

4. The method in accordance with claim 1, wherein in a further stage, an energy spectrum dataset is corrected numerically to a notional infinitely thick detector.

5. The method in accordance with claim 1, wherein the semiconductor device is a device able to act as a detector for high energy radiation and high energy electromagnetic radiation, wherein the high energy radiation and the high energy electromagnetic radiation comprises x-rays or gamma rays or subatomic particle radiation.

6. The method in accordance with claim 1, wherein the semiconductor device is a detector device adapted to exhibit a spectroscopically variable response across at least a substantial part of a radiation spectrum in use.

7. The method in accordance with claim 1, wherein the semiconductor device comprises a material formed as a bulk single crystal.

8. The method in accordance with claim 1, wherein the semiconductor device comprises a material selected from cadmium telluride, cadmium zinc telluride (CZT), cadmium manganese telluride (CMT), and alloys thereof.

9. The method in accordance with claim 8, wherein the material comprises crystalline $Cd_{1-(a+b)}Mn_aZn_bTe$ where $a+b<1$ and a and/or b may be zero.

10. The method in accordance with claim 1, wherein a radiation source is a broad spectrum source across which a plurality of bandwidths or single energies may be identified.

11. A method of detection of radiation comprising the steps of:
causing radiation to impinge on a face of the semiconductor device; and
processing the detected radiation in accordance with claim 1.

12. A device for detection of radiation comprising:
a semiconductor radiation detector;
a means for detecting an energy pulse at the semiconductor radiation detector by sampling a response of the semiconductor radiation detector;
a pulse energy reader configured to measure energy of the energy pulse;
a clock means to determine an amount of time the pulse energy exceeds a predetermined threshold energy;
a pulse time parameter data register configured to store predetermined parameter(s) for the time that the pulse energy exceeds a predetermined threshold energy comprising at least a predetermined maximum;
a data processing module configured to evaluate whether the time that the pulse energy exceeds a predetermined threshold energy is within the predetermined parameter(s), to store the pulse energy reading in a first pulse energy data register if the time is within the predetermined parameter(s), and to discard the pulse energy reading and increment a count in a second discard data register if the determined time is above a predetermined maximum; and
a spectrum correction module configured to supplement a dataset of pulse energy readings by numerically correcting discarded counts by addressing the second discard data register and adding these corrected counts back into the dataset of pulse energy readings.

13. The device in accordance with claim 12, wherein the pulse time parameter data register stores a predetermined minimum time, and wherein the data processing module is configured to evaluate whether the time that the pulse energy exceeds a predetermined threshold energy is below the predetermined minimum time, responsive to an evaluation that the time that the pulse energy exceeds the predetermined threshold energy is below the predetermined minimum time, discard the pulse energy reading entirely as assumed noise.

* * * * *